UNITED STATES PATENT OFFICE.

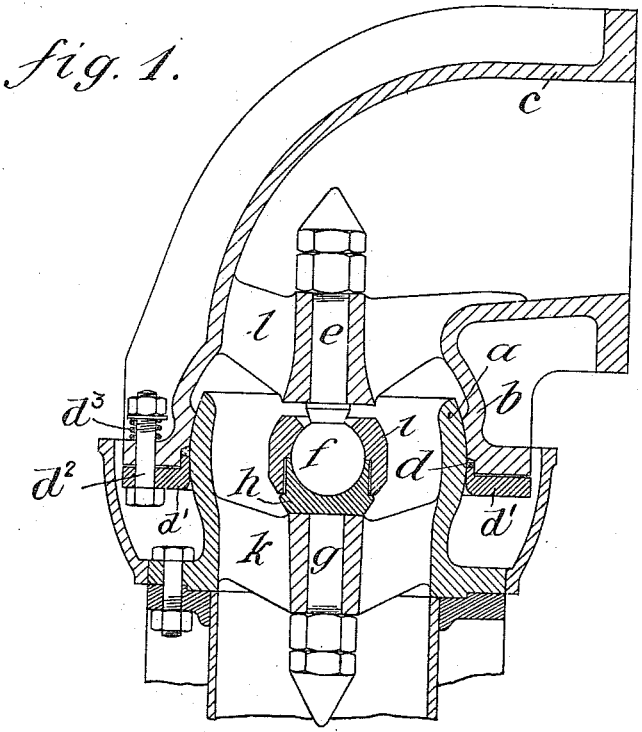
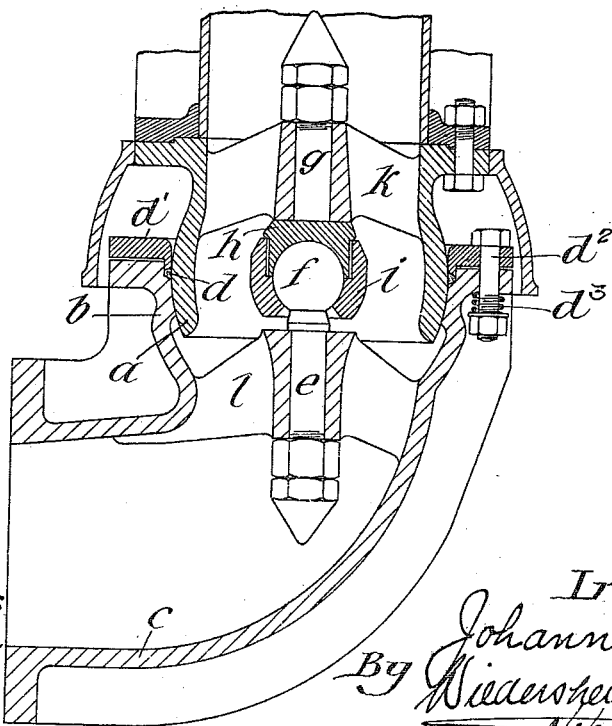

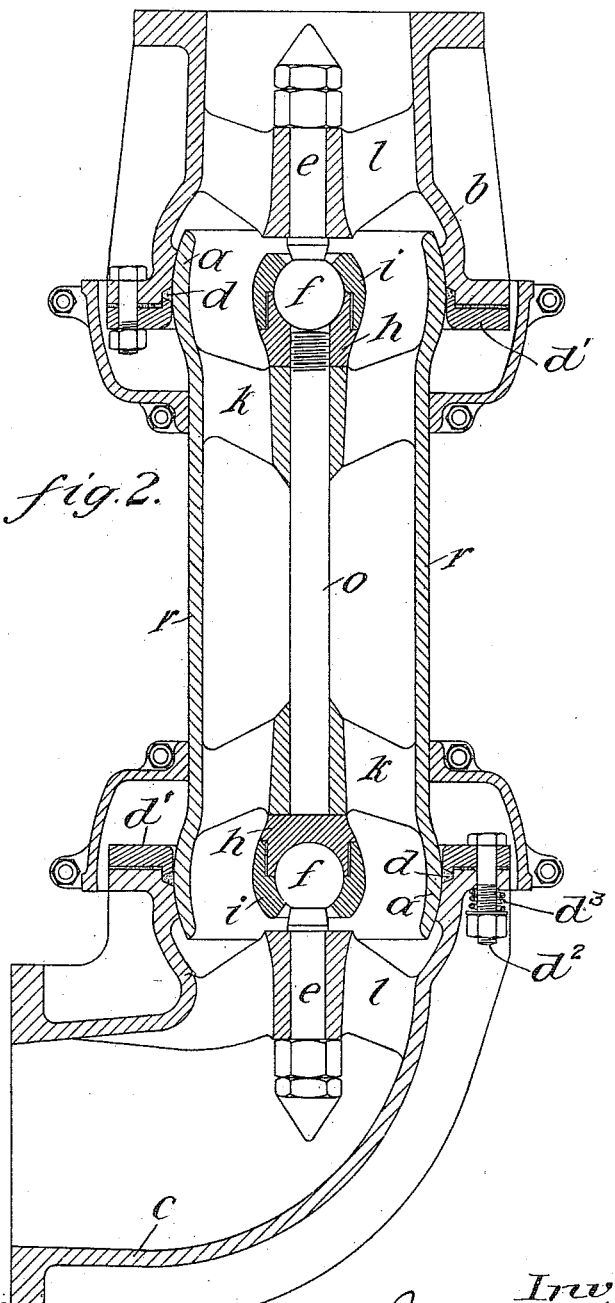

JOHANN KOENIG, OF RIGA, RUSSIA.

FLEXIBLE PIPE-JOINT.

979,513.   Specification of Letters Patent.   Patented Dec. 27, 1910.

Application filed March 24, 1909. Serial No. 485,436.

*To all whom it may concern:*

Be it known that I, JOHANN KOENIG, engineer, a subject of the King of Bavaria, residing at 97 Alexanderstrasse, Riga, Russia, have invented new and useful Improvements in Flexible Pipe-Joints, of which the following is a specification.

The subject of my invention is a flexible pipe-joint, suitable for divers descriptions of pipe connections, and permitting unhindered extension and contraction of the piping due to differences of temperature.

The flexible pipe joint is made as heretofore with an outer ball joint and with an inner ball joint whose center point coincides with the center point of the outer joint, and, under my invention, the ball member of the inner joint is confined in a bearing on the socket member by means of a cap secured to the said bearing, which bearing, and cap, inclose the ball member in such manner that the inner joint takes, off the outer joint, the pressure in either (opposite) longitudinal direction, the joint being, thus, equally applicable to pipes adapted for pressures below atmospheric as for pipes adapted for pressures above atmospheric pressure.

In the accompanying drawings the invention is shown applied, by way of example, to longitudinal compensators for piping.

In both the figures like parts are indicated by like reference-letters.

Figure 1 is a longitudinal section through a longitudinal compensator for piping, in which the pipe and the bend are connected by means of an internally located ball and socket joint. Fig. 2 is a view of a modification, in which two ball and socket joints are united and the intermediate pipe formed with globular socket ends.

Referring to Fig. 1, the connecting piece $a$ is of spherical shape and is received by the similarly spherically shaped end $b$ of the bend $c$. $d$ is the packing for making a tight joint between the parts $a$ and $b$; it can be kept tightly pressed by means of a gland $d^1$, and its central plane passes through the center of the ball and socket joint. The part $b$ embraces the part $a$ from the one side, only as far as the gasket $d$, in such manner that the spherical surfaces are not loaded by the internal pressure, the latter tending to separate them. The steam pressure is taken up by the ball and socket joint located in the interior of the pipes. This joint consists of a bolt $e$ whose end presents a ball $f$. To the other pipe end there is secured a bolt $g$ presenting a cup-bearing $h$ for the ball $f$, which is confined by the cap $i$. The bolts $g$ and $e$ are rigidly united with the connecting-piece $a$ and bend $c$ respectively by ribs $k$ and $l$, or in other suitable manner. The center point of the ball $f$ coincides with that of the ball and socket-joint $a$, $b$, so that rotation of the ends of pipe and bend relatively to each other is in nowise prevented. If, now, the medium, for instance steam, is let into the interior of the piping, the increase of temperature causes expansion of the pipes and the different parts of the joint are shifted relatively to each other, and the coincidence of the center-points of the balls enables universal motion of the entire joint, the strain caused by the pressure of the medium being taken up by the inner small ball and socket joint. The lateral pressures also are taken up by the inner joint and do not load the packing, since at the inner joint no play is necessary, such as is requisite between the outer spherical shaped ends of the pipe and bend. The bolts $d^2$ for tightening the gland $d'$ may advantageously be proivded with a resilient washer or spring $d^3$ to permit a certain amount of elasticity at the packed joint.

The device illustrated in Fig. 2 differs from that shown in Fig. 1 in so far that the bolts $g$ of the latter construction are replaced by a connecting-rod $o$. A further feature of this modification is that the spherical shaped pieces $a$ are formed integrally with the intermediate-pipe $r$, so that the flanged connections between end-pieces and intermediate-pipe are dispensed with, whereby the device is rendered simpler.

Having thus described my invention, I declare that what I claim is:—

1. A flexible pipe joint comprising two pipes making a ball and socket joint with each other, and, located within the pipes and connecting them, a second ball and socket joint whose center point coincides with that of the said first joint, and which consists of a ball member connected to the one pipe and engaging a bearing cup connected to the other pipe and having a cap by means of which the ball member is confined in the bearing cup, so that the inner ball and socket joint is adapted to take off the outer joint the pressure in either longitudinal direction.

2. A flexible pipe joint comprising two pipes making a ball and socket joint with each other, a second inner ball and socket joint whose center point coincides with that of the first joint, and ribs in the interior of each pipe for connecting the inner ball and socket joint members thereto and the one inner joint member consisting of a ball and the other of a socket part which is made in parts and surrounds or incloses the ball member in such manner that the inner joint takes off the outer joint the pressure in either longitudinal direction.

In witness whereof I have hereunto signed my name this fifth day of March 1909 in the presence of two subscribing witnesses.

JOHANN KOENIG.

Witnesses:
    KONRAD NOLL,
    WITOLD KARPONRES.